(12) United States Patent
Stark et al.

(10) Patent No.: US 10,218,435 B2
(45) Date of Patent: Feb. 26, 2019

(54) MULTIPLE POLARIZATION FIBER OPTIC TELEMETRY

(71) Applicant: Halliburton Energy Services, Inc., Houston, TX (US)

(72) Inventors: Daniel Joshua Stark, Houston, TX (US); David Andrew Barfoot, Houston, TX (US); Wei Zhang, Plano, TX (US); Neerja Aggarwal, Cambridge, MA (US)

(73) Assignee: Halliburton Energy Services, Houston, TX (US)

( * ) Notice: Subject to any disclaimer, the term of this patent is extended or adjusted under 35 U.S.C. 154(b) by 0 days.

(21) Appl. No.: 15/329,541

(22) PCT Filed: Dec. 9, 2015

(86) PCT No.: PCT/US2015/064635
§ 371 (c)(1),
(2) Date: Jan. 26, 2017

(87) PCT Pub. No.: WO2017/099740
PCT Pub. Date: Jun. 15, 2017

(65) Prior Publication Data
US 2018/0269966 A1    Sep. 20, 2018

(51) Int. Cl.
*H04B 10/077* (2013.01)
*E21B 47/12* (2012.01)
(Continued)

(52) U.S. Cl.
CPC ......... *H04B 10/0775* (2013.01); *E21B 47/12* (2013.01); *E21B 47/123* (2013.01);
(Continued)

(58) Field of Classification Search
CPC ... E21B 47/12; E21B 47/123; H04B 10/2587; H04B 10/532; H04B 10/614;
(Continued)

(56) References Cited

U.S. PATENT DOCUMENTS 6,549,311 B1    4/2003 Hakki et al.
7,515,774 B2    4/2009 Vannuffelen et al.
(Continued)

FOREIGN PATENT DOCUMENTS

WO    WO 2004/020789 A2    3/2004

OTHER PUBLICATIONS

International Search Report and the Written Opinion of the International Search Authority, or the Declaration, Sep. 1, 2016, PCT/US2015/064635, 17 pages, ISA/KR.
Sundsoy, P. R., "Depolarization of Orthogonal States of Polarization in Fiber Optic High-Speed Transmission," Master's Thesis, Department of Physics, NTNU Trondheim, Jul. 29, 2004. http://www.sundsoy.com/Diplomoppgave.pdf.

*Primary Examiner* — Ted M Wang
(74) *Attorney, Agent, or Firm* — Haynes and Boone, LLP

(57) ABSTRACT

A downhole tool apparatus is disclosed that includes an input fiber optic cable coupled to an electro-optic modulator. The input fiber optic cable propagates first and second actively orthogonally polarized light beams. The electro-optic modulator modulates the first and second actively orthogonally polarized light beams in response to a measurement data stream (e.g., telemetry data). A single light beam comprising the modulated first and second actively orthogonally polarized light beams is propagated over an output fiber optic cable so that the modulated first and the second actively orthogonally polarized light beams propagate the same data through the output fiber optic cable. Recovery circuitry coupled to the single light beam is then used to detect, demodulate, and decode the original measurement data stream.

18 Claims, 9 Drawing Sheets

(51) Int. Cl.
  *H04B 10/2587* (2013.01)
  *H04B 10/532* (2013.01)
  *H04B 10/61* (2013.01)

(52) U.S. Cl.
  CPC ....... *H04B 10/2587* (2013.01); *H04B 10/532* (2013.01); *H04B 10/614* (2013.01); *H04B 2210/074* (2013.01)

(58) Field of Classification Search
  CPC . H04B 10/0775; H04B 10/2569; H04J 14/06; H04J 14/02; H04Q 11/0005
  See application file for complete search history.

(56) References Cited

U.S. PATENT DOCUMENTS

| | | | |
|---|---|---|---|
| 2002/0067883 A1* | 6/2002 | Lo | H04B 10/532 385/24 |
| 2006/0133711 A1* | 6/2006 | Vannuffelen | E21B 47/123 385/1 |
| 2008/0087078 A1* | 4/2008 | Vannuffelen | E21B 47/102 73/152.54 |
| 2009/0224936 A1 | 9/2009 | Vannuffelen et al. | |
| 2012/0257475 A1 | 10/2012 | Luscombe et al. | |
| 2013/0056197 A1 | 3/2013 | Maida et al. | |
| 2015/0020598 A1 | 1/2015 | Wang | |

* cited by examiner

MULTIPLE POLARIZATION FIBER OPTIC TELEMETRY

PRIORITY

The present application is a U.S. National Stage patent application of International Patent Application No. PCT/US2015/064635, filed on Dec. 9, 2015, the benefit of which is claimed and the disclosure of which is incorporated herein by reference in its entirety.

BACKGROUND

In drilling wells for oil and gas exploration, understanding the structure and properties of the associated geological formation provides information to aid such exploration. Logging measurements may be performed in a borehole to obtain this information. However, the environment in which the drilling tools operate and where measurements are made may be located at significant distances below the surface. It may be desirable to transmit downhole logging measurements to the surface for analysis and control purposes.

Electrical cables have been investigated for high speed telemetry to and from downhole tools. Use of electrical cables for such communication, however, has drawbacks due to limitations with information bandwidth. Optical fibers have also been investigated for high speed communications to and from downhole tools to overcome the information bandwidth limitations of electrical cables. However, stresses imposed on the optical fiber in the downhole environment may cause a change in the light polarization by the time it reaches the surface. This may cause a loss of signal at the surface polarizer and, thus, a loss of data.

DETAILED DESCRIPTION

Some of the challenges noted above, as well as others, may be addressed by using dual polarization of data streams. Downhole telemetry signal-to-noise ratio (SNR) and data integrity may be improved by using two orthogonal polarization modes in transmitting separate data streams through an optical fiber. The data streams may use the same encoder or each data stream may be separately encoded. By actively polarizing each data stream into orthogonal polarizations prior to transmission through optical fiber, at least one data stream may be successfully received and demodulated if the polarization of the other data stream is shifted from its axis during transmission from the downhole environment.

As used herein, the term "actively polarized" is defined as polarizing one or more light beams with a polarizing circuit or device. Actively polarized is differentiated from induced polarization of a light beam. The induced polarization of a light beam in a fiber optic cable may occur when the fiber optic cable has been subjected to downhole stress (e.g., pressure, temperature, sheer and tension forces).

Figure 1:
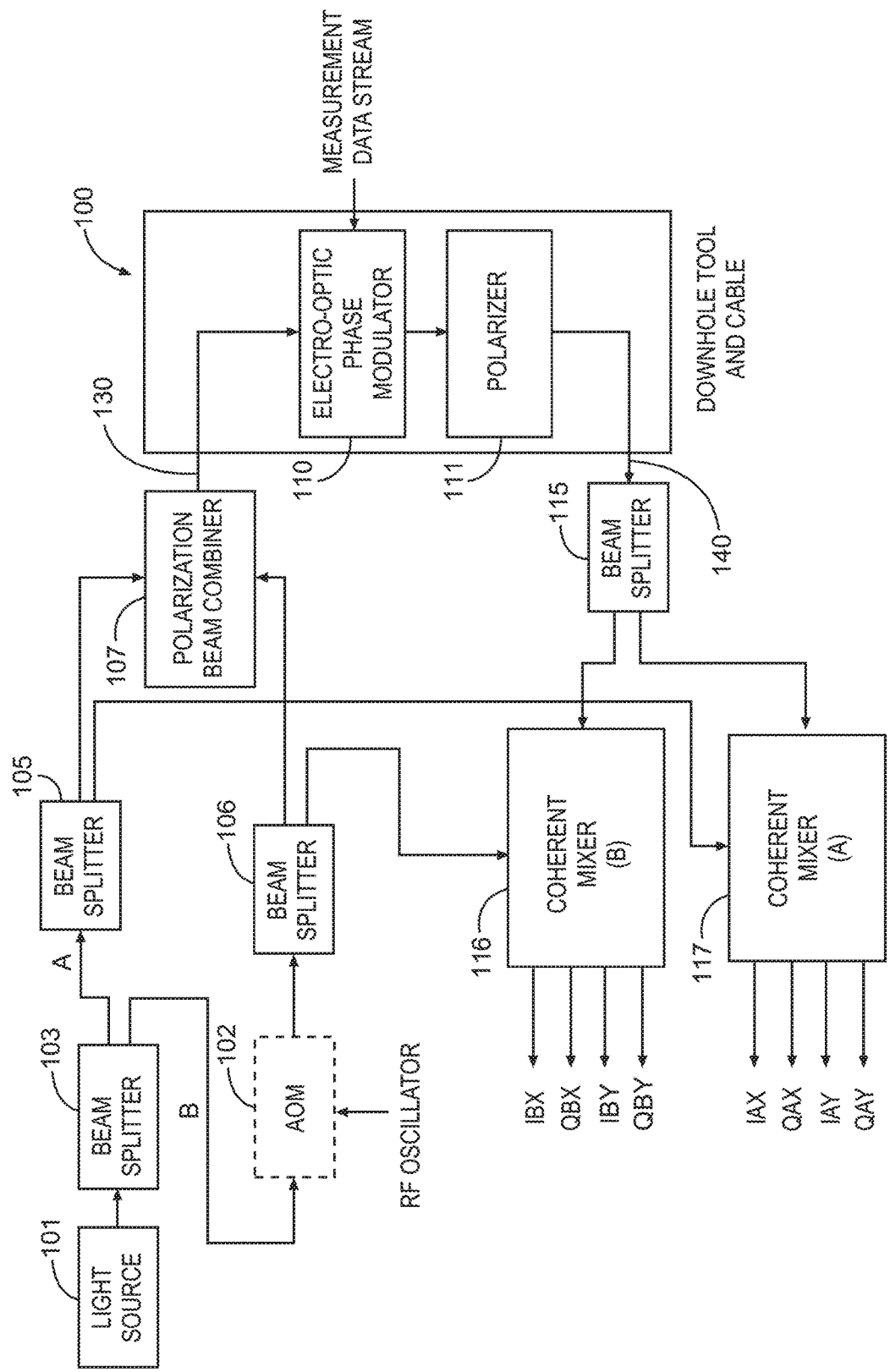
FIG. 1 is a block diagram showing a dual polarization system using one light source, according to various embodiments.

FIG. 1 is a block diagram showing a dual polarization telemetry system using one light source, according to various embodiments. This system illustrates only one embodiment for the active dual polarization of data streams from a downhole environment. Dual polarization of data streams may be accomplished in other ways.

A light source 101 (e.g., laser) generates a coherent light beam for transmission through the system. The light source 101 is coupled to a first beam splitter 103 (e.g., 1×2). The splitter 103 generates two light paths: an A light signal and a B light signal. The outputs of the first beam splitter 103 are coupled to a second beam splitter 105 (e.g., 1×2) and may be coupled to an optional acousto-optical modulator (AOM) 102. Thus, the A light signal from the first beam splitter 103 is input to the second beam splitter 105. The B light signal from the first beam splitter 103 is input to the AOM 102.

The AOM 102 is further coupled to a radio frequency (RF) signal from an RF oscillator (not shown) or some other RF signal source. The AOM 102 uses an acousto-optic effect to diffract and shift the frequency of light using the RF signal. The AOM 102 includes a piezoelectric transducer, coupled to a material (e.g., glass, quartz), that is driven to vibrate by the input RF signal thus creating sound waves in the material. The input B light signal is scattered by the vibrating material such that the output light signal from the AOM 102 is shifted in frequency based on the frequency of the input RF signal. For example, the higher the RF signal frequency, the greater the light frequency shift of the output light signal from the AOM 102. The output light signal may be shifted by a frequency in a range of a multiple megahertz (MHz) to 1 gigahertz (GHz). The AOM 102 is coupled to a third beam splitter 106 (e.g., 1×2) such that the frequency shifted light signal from the AOM 102 is input to the third beam splitter 106. In another embodiment, an electro-optic phase modulator with an RF signal input may be used in place of the AOM 102.

Since the AOM 102 provides a frequency shifted light signal, any destructive effectives in the input B light signal will also be shifted to another frequency from the A light signal. This frequency shift may not be necessary in all situations so that, in another embodiment, the B light signal from the first beam splitter 103 may be input directly to the third beam splitter 106.

The second and third beam splitters 105, 106 are coupled to a polarization beam combiner 107 and respective coherent mixers 116, 117 (e.g., 2×4, 2×8). Thus, a first light signal from each of the second and third beam splitters 105, 106 are input to the polarization beam combiner 107. A second light signal from each of the second and third beam splitters 105, 106 is input to their respective coherent mixer 116, 117 and acts as a local oscillator reference signal in its respective mixer 116, 117.

The polarization beam combiner 107 generates a single light signal that is made up of the two separate light signals A and B. The polarization beam combiner 107 changes the polarization of one of the input light signals (e.g., A light signal) so that it is orthogonal to the polarization of the other light signal (e.g., B light signal) before outputting the single light signal that is the combination of the orthogonally polarized A and B light signals. For example, the A light signal may be polarized along the x-axis and the B light signal may be polarized along the y-axis. Another embodiment may use other orthogonal polarization.

The polarization beam combiner 107 is coupled to a downhole tool apparatus 100 through an input single mode fiber optic cable 130. The downhole tool 100 may be located in a wireline tool for wireline logging operations or in a tool in a bottom hole assembly (BHA) for drilling operations.

The downhole tool 100 includes an electro-optic phase modulator 110 that may be coupled to a polarizer 111. The light signal comprising the orthogonally polarized A and B light signals is input to the electro-optic phase modulator 110 and the light signal modulated by the measurement data stream from the downhole tool measurements is output from the polarizer 111, if the polarizer is used.

The electro-optic phase modulator 110 may be a multiple stage device. For example, the signal (as a single polarization or as separate polarizations) may go through multiple and distinct phase modulators, amplitude modulators, and/or combinations thereof.

In another embodiment, the signal output from the electro-optic phase modulator 110 may be separated into X and Y components. Each component would have a respective modulator so that each modulator can be tuned to a voltage range suitable for its respective polarization. One example of such an embodiment is illustrated in the apparatus 300 of FIG. 3.

The electro-optic phase modulator 110 is an optical device in which a signal-controlled element (e.g., crystal) exhibiting electro-optic effects is used to modulate a beam of light. The electro-optic effect is the change in the refractive index of the element resulting from the application of an electric field. Thus, the refractive index of the element is a function of the strength of the local electric field. By changing the electric field in the crystal according to the data stream, the phase of the light exiting the electro-optic phase modulator 110 is modulated and encodes the data.

The polarizer 111 may be used to restrict the incoming light signal to just one of the two orthogonal polarizations. For example, if a light signal enters the polarizer 111 that has a component that is not either the X or Y polarization originally imposed on the light signal, the polarizer 111 blocks those components.

The polarizer 111 is shown after the electro-optic phase modulator 110. However, if a polarizer 111 is used, it may be either after the modulator 110 or prior to the modulator 110. In another embodiment, the polarizer 111 is not used and the output of the modulator 110 is output from the downhole tool 100 for transmission uphole through an output single mode fiber optic cable 140.

Either the electro-optic phase modulator 110 or the polarizer 111 (if used) is coupled to data recovery circuitry that may include a fourth beam splitter 115 (e.g., 1×2) that is coupled to first and second coherent mixers 116, 117 (e.g., 2×4 or 2×8 coherent mixers). For example, one beam from the splitter 115 may be input to the first mixer 116 and a second beam from the splitter 115 may be input to the second mixer 117.

In an embodiment, the data recovery circuitry may include the fourth beam splitter 115, the first and second coherent mixers 116, 117, as well as other optical and/or electrical circuitry to recover the original measurement data stream. In another embodiment, the recover circuitry may not include the fourth beam splitter 115. The recovery circuitry is configured to recover (i.e., detect, demodulate, and/or decode) the measurement data stream.

The second mixer 117 is also coupled to the second beam splitter 105. The original A light signal from the beam splitter 105 is used as a local oscillator reference signal into the mixer 117 to generate light states ($I_{Ax}$, $Q_{Ax}$, $I_{Ay}$, $Q_{Ay}$) in the complex-field space. These states, referred to as phasor I and phasor Q for the X and Y polarizations, are a baseband component containing the phase signal to be demodulated and a heterodyne beat frequency component containing the phase signal from the other optical frequency (centered at the AOM frequency after mixing). The baseband phase signal can be recovered by applying an electrical analog or digital low-pass filter (not shown) to suppress the heterodyne signal. For example, if the AOM 102 is providing a 500 MHz frequency shift, a low-pass filter at 250 MHz cutoff may be applied. This enables a spectral width of 500 MHz (±250 MHz) for the telemetry data.

The first mixer 116 is also coupled to the third beam splitter 106. The original B light signal from the beam splitter 106 is used as a local oscillator reference signal into the mixer 116 to generate recovered light states ($I_{Bx}$, $Q_{Bx}$, $I_{By}$, $Q_{By}$) in the complex-field space. The optical receivers containing the B signal also includes the A signal. However in this case, the B signal is at baseband and the A signal shows up centered at 500 MHz. A low-pass filter may be used after the receivers to remove the A signal electrically. Alternatively, the low-pass filter may be omitted by selecting optical receivers with a bandwidth below the cutoff frequency of the low-pass filter thus serving the role of the LPF at the same time. In yet another embodiment, the heterodyne signals may be demodulated by a band-pass filter instead of discarding the high frequency components.

The data stream recovered from the second mixer 117 is the same data stream that was recovered from the first mixer 116. One of the data streams may have been corrupted by stresses imposed on the fiber optic cable going to or from the downhole tool 100. One or more techniques (e.g., averaging) may be used on the recovered phasors from the mixers 116, 117 in order to generate a single recovered data stream. Examples of possible averaging techniques are discussed subsequently.

Figure 2:
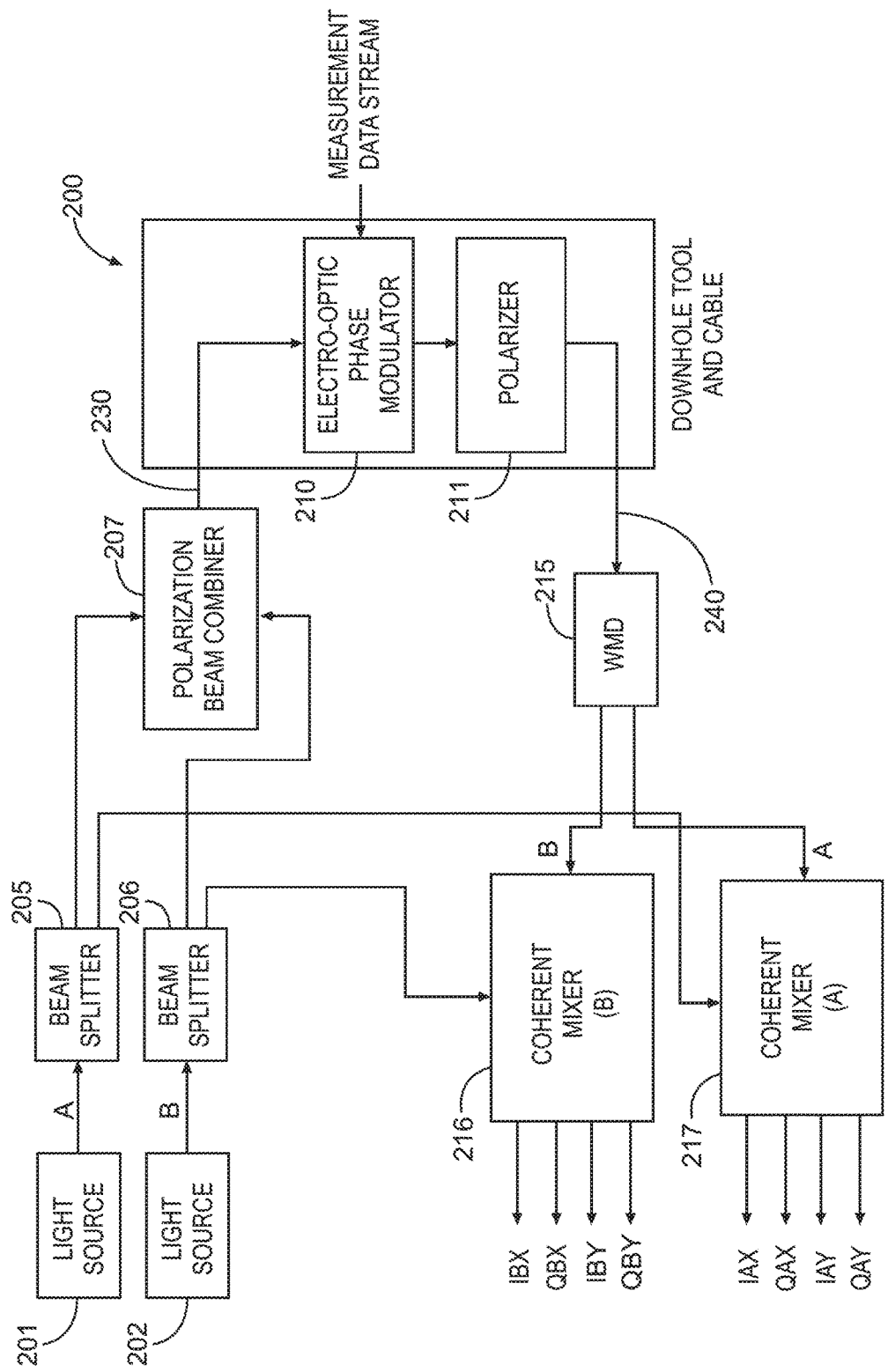
FIG. 2 is a block diagram showing a dual polarization system using multiple light sources, according to various embodiments.

FIG. 2 is a block diagram showing a dual polarization telemetry system using multiple light sources, according to various embodiments. This system illustrates only one embodiment for the active dual polarization of data streams from a downhole environment using multiple light sources.

First and second light sources 201, 202 (e.g., lasers) each generate a coherent light beam (A and B) for transmission through the system. Each light source 201, 202 is coupled to a respective first or second beam splitter 205, 206 (e.g., 1×2). Each of the splitters 205, 206 generates two light signals. One light signal from each splitter 205, 206 is input to a polarization beam combiner 207 that is coupled to both splitters 205, 206. The other light signal from each splitter 205, 206 is coupled to a respective coherent mixer 216, 217 as a reference oscillator signal.

The polarization beam combiner 207 generates a single light signal that is made up of the two separate light signals A and B. The polarization beam combiner 207 changes the polarization of one of the input light signals (e.g., A light signal) so that it is orthogonal to the polarization of the other light signal (e.g., B light signal) before outputting the single light signal that is the combination of the orthogonally polarized A and B light signals. For example, the A light signal may be polarized along the x-axis and the B light signal may be polarized along the y-axis. Another embodiment may use other orthogonal polarization.

The polarization beam combiner 207 is coupled to the downhole tool 200 through an input single mode fiber optic cable 230. The downhole tool 200 may be a wireline tool for wireline logging operations or a tool in a bottom hole assembly (BHA) for drilling operations.

The downhole tool 200 includes an electro-optic phase modulator 210 that may be coupled to a polarizer 211. The light signal comprising the orthogonally polarized A and B light signals is input to the electro-optic phase modulator 210. This light signal is phase modulated by the data stream from downhole tool measurements and is output from the polarizer 111, if the polarizer is used.

The electro-optic phase modulator 210 is an optical device in which a signal-controlled element (e.g., crystal) exhibiting electro-optic effects is used to modulate a beam of light. The electro-optic effect is the change in the refractive index of the element resulting from the application of a DC or low-frequency electric field. Thus, the refractive index of the element is a function of the strength of the local electric field and the phase of the light exiting the electro-optic phase modulator 210 is modulated by the data stream, changing the electric field in the crystal.

The polarizer 211 may be used to restrict the incoming light signal to just one of the two orthogonal polarizations. For example, if a light signal enters the polarizer 211 that has a component that is not either the X or Y polarization originally imposed on the light signal, the polarizer 211 blocks those components.

The polarizer 211 is shown after the electro-optic phase modulator 210. However, if a polarizer 211 is used, it may be either after the modulator 210 or prior to the modulator 210. In another embodiment, the polarizer 211 is not used and the output of the modulator 210 is output from the downhole tool 200 for transmission uphole through an output single mode fiber optic cable 240.

Either the electro-optic phase modulator 210 or the polarizer 211 (if used) is coupled to data recovery circuitry including a wavelength-division multiplexer (WDM) 215 that is coupled to the first and second coherent mixers 216, 217 (e.g., 2×4 or 2×8 coherent mixers). The WDM 215 splits the two orthogonal A and B signals from the input light signal and inputs the resulting A and B light signals to their respective mixer 217, 216. For example, one beam (e.g., B light signal) from the WDM 215 may be input to the first mixer 216 and a second beam (e.g., A light signal) from the WDM 215 may be input to the second mixer 217.

In an embodiment, the data recovery circuitry may include the WDM 215, the first and second coherent mixers 216, 217, as well as other optical and/or electrical circuitry to recover the original measurement data stream. In another embodiment, the recover circuitry may not include the WDM 215. The recovery circuitry is configured to recover (i.e., detect, demodulate, and/or decode) the measurement data stream.

The first mixer 216 is also coupled to the second beam splitter 206. The original B light signal from the second beam splitter 206 is used as a local oscillator reference signal into the mixer 216 to generate light states ($I_{Bx}$, $Q_{Bx}$, $I_{By}$, $Q_{By}$) in the complex-field space.

The second mixer 217 is also coupled to the first beam splitter 205. The original A light signal from the first beam splitter 205 is used as a local oscillator reference signal into the mixer 217 to generate light states ($I_{Ax}$, $Q_{Ax}$, $I_{Ay}$, $Q_{Ay}$) in the complex-field space.

The low-pass electrical filters may not be used in this embodiment since the light signals are already on separate paths before they get to the mixers 216, 217 due to the WDM 215. Alternatively, the WDM 215 may be replaced by a splitter and the mixing provided by the local oscillators will effectively separate the signals since the heterodyne beat frequency from an undesired optical signal will be of such high frequency (e.g., 12.5 GHz or higher) relative to the optical receiver bandwidth (typically below 10 GHz) that no electrical filtering is used.

The data stream recovered from the second mixer 217 is the same data stream that was recovered from the first mixer 216. One of the data streams may have been corrupted by stresses imposed on the fiber optic cable going to or from the downhole tool 200. One or more techniques (e.g., averaging) may be used on the recovered phasors from the mixers 216, 217 in order to generate a single recovered data stream. Examples of possible averaging techniques are discussed subsequently.

Figure 3:
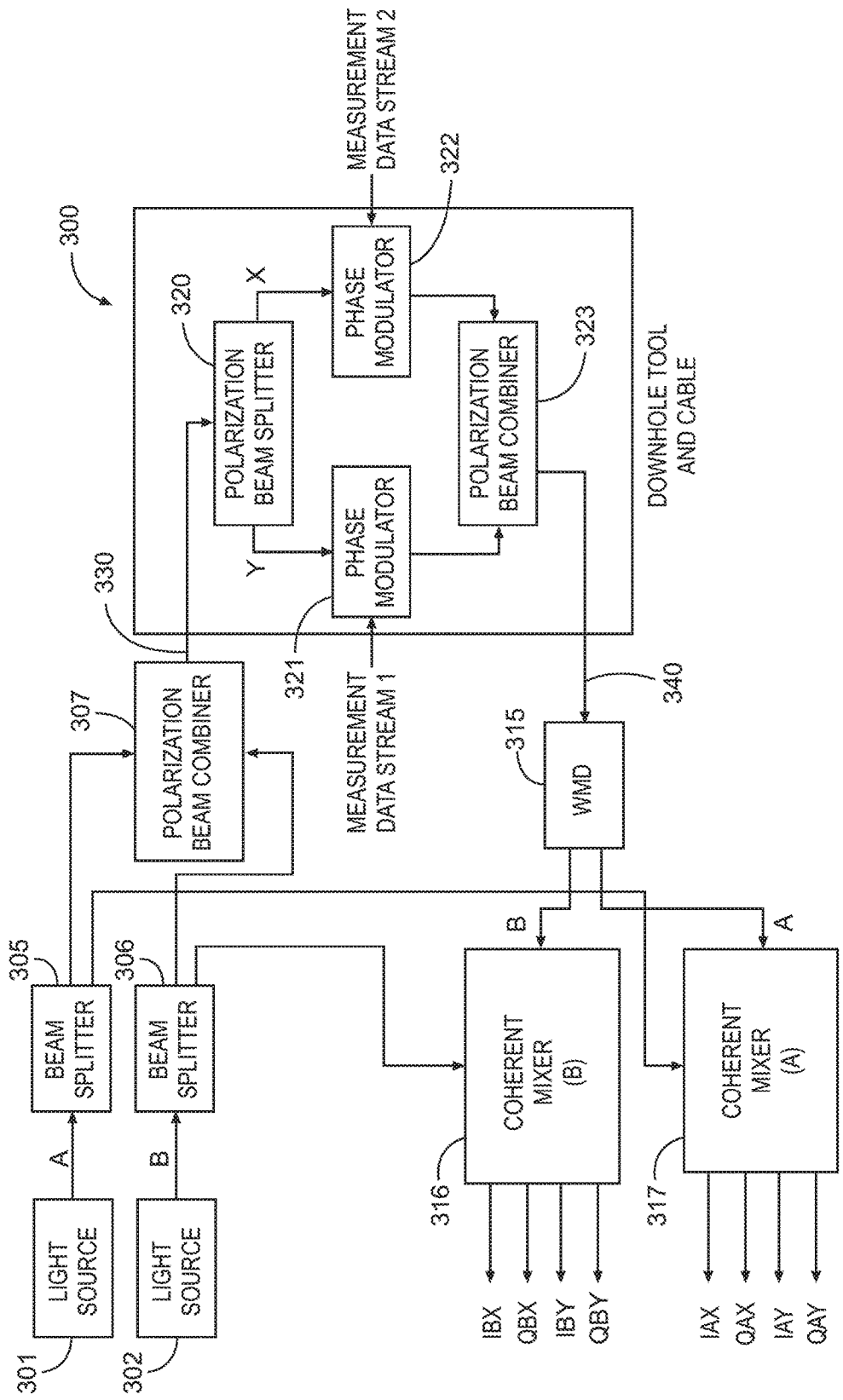
FIG. 3 is a block diagram showing a dual polarization system using multiple light sources and separately encoded data streams, according to various embodiments.

FIG. 3 is a block diagram showing a dual polarization telemetry system using multiple light sources and separately encoded data streams, according to various embodiments. The system of FIG. 3 may be used in an embodiment where light signals received on the surface from the downhole tool 300 already exhibit a relatively high SNR. In such an embodiment, the two recovered data streams may not be averaged. In this embodiment, two separate data streams may be encoded into the two orthogonally polarized signals to be transmitted uphole through an output single mode fiber optic cable 340.

First and second light sources 301, 302 (e.g., lasers) each generate a coherent light beam (A and B) for transmission through the system. Each light source 301, 302 is coupled to a respective first or second beam splitter 305, 306 (e.g., 1×2). Each of the splitters 305, 306 generates two light signals. One light signal from each splitter 305, 306 is input to a polarization beam combiner 307 that is coupled to both splitters 305, 306. The other light signal from each splitter 305, 306 is input to a respective coherent mixer 316, 317 as a reference oscillator signal.

The polarization beam combiner 307 generates a single light signal that is made up of the two separate light signals A and B. The polarization beam combiner 307 changes the polarization of one of the input light signals (e.g., A light signal) so that it is orthogonal to the polarization of the other light signal (e.g., B light signal) before outputting the single light signal that is the combination of the orthogonally polarized A and B light signals. For example, the A light signal may be polarized along the x-axis and the B light signal may be polarized along the y-axis. Another embodiment may use other orthogonal polarization.

The polarization beam combiner 307 is coupled to the downhole tool 300 through an input single mode fiber optic cable 330. The downhole tool 300 may be a wireline tool for wireline logging operations or a tool in a bottom hole assembly (BHA) for drilling operations.

The downhole tool 300 includes a polarization beam splitter 320 that is coupled to the polarization beam combiner 307 over the fiber optic cable 330. The polarization beam splitter 320 splits the original orthogonally polarized light signals (e.g., X-polarized and Y-polarized) from the single light signal. These light signals are input to respective phase modulators 321, 322 that are coupled to the polarization beam splitter 320.

The two different measurement data streams are each input to their respective phase modulator 321, 322. For example, measurement data stream 1 may be input to a first phase modulator 321 to modulate the Y-polarized light signal. The measurement data stream 2 may be input to a second phase modulator 322 to modulate the X-polarized light signal.

The phase modulators 321, 322 are coupled to a polarization beam combiner 323. The polarization beam combiner 323 combines the modulated light signals from the respective phase modulators 321, 322. Thus, the orthogonally polarized light signals that are now modulated with their respective data streams, are now recombined for transmission over a fiber optic cable 340 to the surface. In an embodiment, a polarizer (not shown in FIG. 3) may be associated with each phase modulator 321, 322 and coupled between the polarization beam splitter 20 and the polarization beam combiner 323 in the tool 300.

Either the polarization beam combiner 323 or the polarizer (if used) is coupled to data recovery circuitry including a wavelength-division multiplexer (WDM) 315 that is coupled to the first and second coherent mixers 316, 317 (e.g., 2×4 or 2×8 coherent mixers). The WDM 315 splits the two orthogonal A and B signals from the input light signal and inputs the resulting A and B light signals to their respective mixer 317, 316. For example, one beam (e.g., B light signal) from the WDM 315 may be input to the first mixer 316 and a second beam (e.g., A light signal) from the WDM 315 may be input to the second mixer 317.

In an embodiment, the data recovery circuitry may include the WDM 315, the first and second coherent mixers 316, 317, as well as other optical and/or electrical circuitry to recover the original measurement data stream. In another embodiment, the recover circuitry may not include the WDM 315. The recovery circuitry is configured to recover (i.e., detect, demodulate, and/or decode) the measurement data stream.

The first mixer 316 is also coupled to the second beam splitter 306. The original B light signal from the second beam splitter 306 is used as a local oscillator reference signal into the mixer 316 to generate light states ($I_{Bx}$, $Q_{Bx}$, $I_{By}$, $Q_{By}$) in the complex-field space.

The second mixer 317 is also coupled to the first beam splitter 305. The original A light signal from the first beam splitter 305 is used as a local oscillator reference signal into the mixer 317 to generate light states ($I_{Ax}$, $Q_{Ax}$, $I_{Ay}$, $Q_{Ay}$) in the complex-field space.

The above-described embodiments may also use an intensity modulator that has the same polarization sensitivity as a phase modulator. For the embodiment of FIG. 1 using the AOM, after applying a low-pass or band-pass filter, the I and Q outputs of the coherent mixer may be used to calculate an amplitude via $\sqrt{I^2+Q^2}$ that corresponds to the intensity that contains the telemetry information applied to the signal by the intensity modulator. For the embodiment of FIG. 2, the coherent mixer may be removed and a single detector used to quantify the intensity since the signal has already been separated into frequency components by the WDM.

The above-described embodiments may also include other components than those shown. For example, optical filters may be incorporated in various locations to limit that particular light signal to a certain wavelength. Polarization controllers, attenuators, and/or optical amplifiers may also be incorporated into various locations of any of the embodiments of FIGS. 1-3.

The above-described embodiments may indicate that certain components are located downhole in the downhole tool 100, 200, 300 while other components are located on the surface. This is for purposes of illustration only as there are no restrictions on the location of any of the components. All of the components may be on the surface, downhole, or any combination thereof. For example, the light source and receiver are shown on the surface while the modulator is shown downhole. In another embodiment, any of these system components may be downhole or on the surface.

The above-described embodiments show the use of a downhole fiber optic cable 130, 230, 330 and a separate uphole fiber optic cable 140, 240, 340. In another embodiment, these cables may be combined into a single fiber optic cable. For example, referring to FIG. 1, a circulator at the surface may connect polarization beam combiner 107 and beam splitter 115 to enable the light to go down a single fiber to the downhole tool. At the tool apparatus 100, another circulator or couplers or couplers with isolators may be used to enable transmission through the modulator from and into the same fiber going from the surface to downhole.

The above-described embodiments use two co-propagating light signals in orthogonal polarization states to overcome small signals and, hence, a low SNR. The demodulated signal results in two Lissajous, one for each polarization state. Examples of two Lissajous patterns are illustrated in FIG. 3 in addition to two distinct phase signals that can be extracted from the demodulated signal to recover the original signal.

Figure 4:
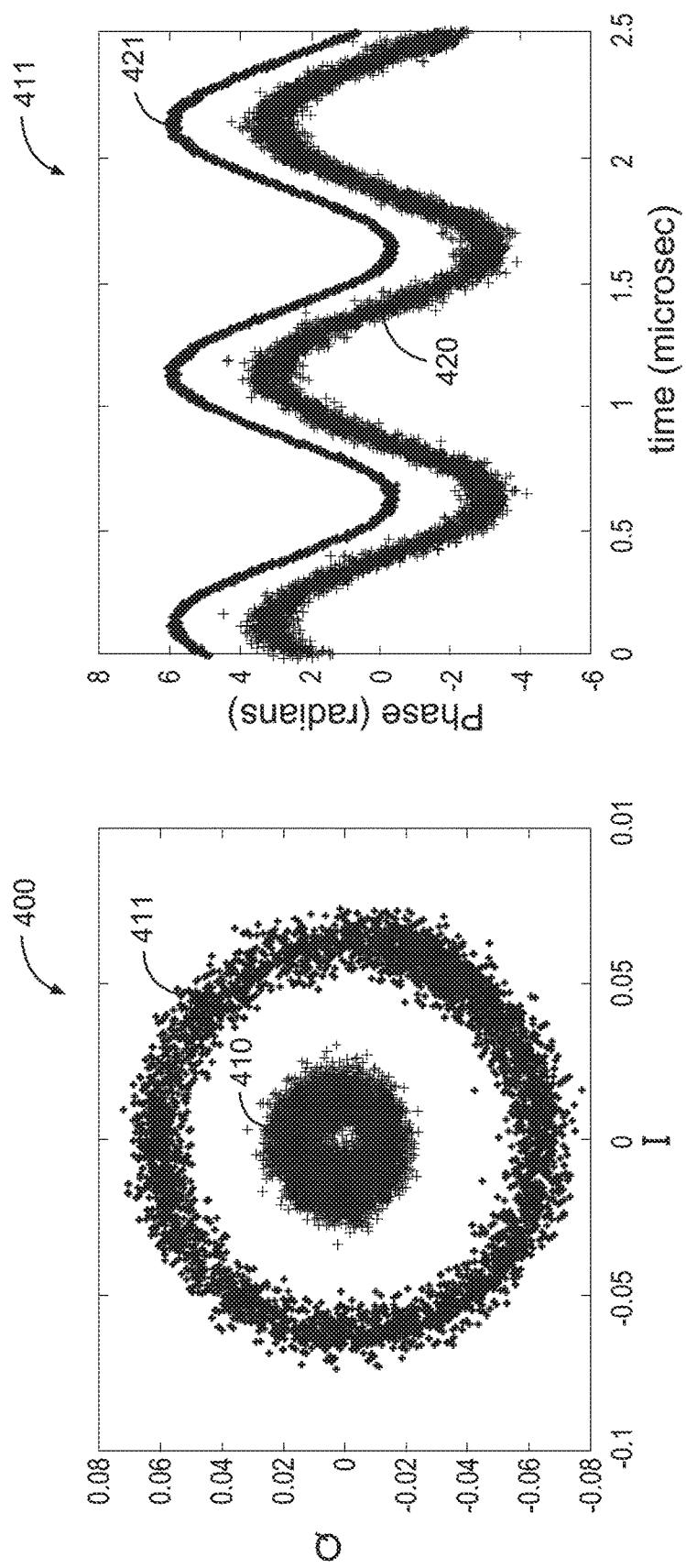
FIG. 4 are plots of Lissajous patterns and their corresponding recovered phase signals for both polarizations, according to various embodiments.

FIG. 4 are plots 400, 401 of Lissajous patterns 410, 411 and their corresponding recovered phase signals 420, 421, according to various embodiments. The first plot shows the two Lissajous patterns 410, 411 with the in-phase component (I) along the X-axis and the quadrature component (Q) along the Y-axis. The second plot shows the corresponding recovered phase signals 420, 421 with time (in microseconds) along the X-axis and the phase (in radians) along the Y-axis.

As can be seen, when the signal is small, resulting in a smaller Lissajous 410, the SNR of the extracted waveform is smaller and may result in a noisier recovered phase signal 420. When the signal is relatively larger, resulting in a larger Lissajous 411, the SNR of the extracted waveform is relatively larger and may result in less noisy recovered phase signal 421.

Both of these Lissajous may be used to extract the cleanest possible phase signal with various methods. For example, one method may determine the radius of each Lissajous at a particular time and use the phase from whichever I/Q value corresponds to the greatest radius. Another method to improve the noise of the low amplitude signal may be to average the phase resulting from the two polarizations.

Averaging methods may include determining a midrange value and several types of means: arithmetic, trimmed, geometric, harmonic, weighted, generalized, or combinations of these. If $x_i$ is assumed to represent a set of data of N values, then these means may be given by the methods shown in the following table:

| MEAN | FORMULA |
|---|---|
| Midrange | $\frac{1}{2}[\max(x_i) + \min(x_i)]$ |
| Arithmetic | $\frac{1}{N}\sum_{i=1}^{N} x_i$ |
| Trimmed | $\frac{1}{n(1-2\alpha)}\left[(1-k-\alpha n)(x_{k+1} + x_{n-k}) + \sum_{i=k+2}^{n-k-1} x_i\right]$, where $\alpha < 0.5$ and $k = \text{round}(\alpha n - 0.5)$ |
| Geometric | $\left(\prod_{i=1}^{N} x_i\right)^{\frac{1}{N}}$ |
| Harmonic | $\dfrac{N}{\sum_{i=1}^{N} \frac{1}{x_i}}$ |
| Weighted | $\sum_{i=1}^{N} w_i x_i$, where $\sum_{i=1}^{N} w_i = 1$ |
| Generalized | $\sqrt[p]{\frac{1}{N}\sum_{i=1}^{N} x_i^p}$ |

As one example of the application of these formulas, the two phase waveforms 420, 421 may be averaged (after removing the phase offset) using both an arithmetic mean and a weighted mean.

Figure 5:
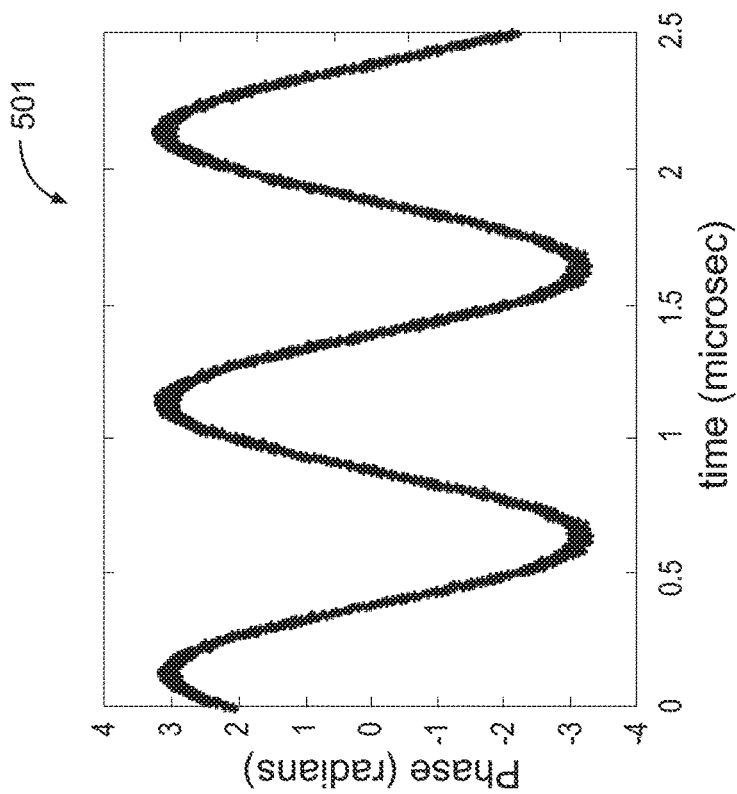
FIG. 5 are plots of waveforms resulting from arithmetic mean and weighted mean of recovered phase signals, according to various embodiments.
Figure 5:
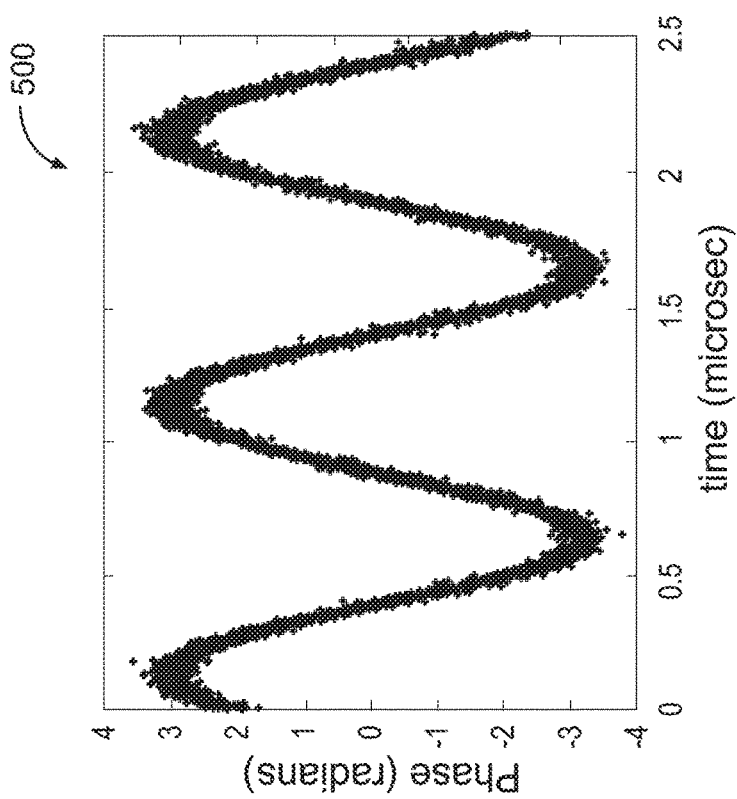

FIG. 5 are plots of waveforms resulting from arithmetic mean 500 and weighted mean 501 of recovered phase signals, according to various embodiments. The arithmetic mean waveform 500 at each instance is generated using:

$$\phi_{ave} = \frac{\phi_{pol1} + \phi_{pol2}}{2}. \qquad \text{Eqn (1)}$$

The weighted mean waveform 501 at each instance is generated using:

$$\phi_{ave} = \frac{r_{pol1}^2 \cdot \phi_{pol1} + r_{pol2}^2 \cdot \phi_{pol2}}{r_{pol1}^2 + r_{pol2}^2} \qquad \text{Eqn (2)}$$

In both cases, the averaged SNR is improved from the recovered phase waveform 420 of FIG. 4. For the arithmetic mean, the SNR may be calculated as 90 while the weighted mean SNR may be calculated as 472. Thus, the weighted mean achieves an SNR even greater than that achieved by the Lissajous with larger radii.

Determining optimal weights to use in the weighted mean calculations may be accomplished in multiple ways. One such method to determine the optimal weights will now be described.

Suppose an average of signals $I_1$ and $I_2$ is done with weights $$\frac{w_1}{w_1 + w_2} \text{ and } \frac{w_2}{w_1 + w_2}$$

so that $$I_{ave} = \frac{w_1 I_1 + w_2 I_2}{w_1 + w_2}. \qquad \text{Eqn (3)}$$

By propagating errors using the method of quadrature, the error for the average signal $\sigma_{I_{ave}}$ is given by:

$$\sigma_{I_{ave}}^2 = \left(\frac{w_1}{w_1+w_2}\right)^2 \sigma_{I_1}^2 + \left(\frac{w_2}{w_1+w_2}\right)^2 \sigma_{I_2}^2, \qquad \text{Eqn (4)}$$

where $\sigma_{I_1}$ and $\sigma_{I_2}$ are the errors for $I_1$ and $I_2$, respectively. The resulting SNR is then:

$$SNR = \sqrt{\frac{I_{ave}^2}{\sigma_{I_{ave}}^2}} = \sqrt{\frac{(w_1 I_1 + w_2 I_2)^2}{w_1^2 \sigma_{I_1}^2 + w_2^2 \sigma_{I_2}^2}} \qquad \text{Eqn (5)}$$

If Equation 5 is optimized with respect to the weights, by taking the partial derivative and setting to zero, the derived weights provide the highest SNR. Two such examples are provided below:

Weights of the Functional Form $w_i$=Constant

Assuming $W_i$ (i=1, 2) are positive numbers, Equation 5 can be optimized with respect to $w_i$:

$$\frac{\partial(SNR)}{\partial w_1} = 0 \rightarrow w_1 = \frac{I_1}{I_2}\left(\frac{\sigma_{I_2}}{\sigma_{I_1}}\right)^2 w_2 \text{ or} \qquad \text{Eqn. (6)}$$

$$\frac{\partial(SNR)}{\partial w_2} = 0 \rightarrow w_2 = \frac{I_2}{I_1}\left(\frac{\sigma_{I_1}}{\sigma_{I_2}}\right)^2 w_1$$

Substituting back into Equation 3 yields an optimal averaging with the form $$I_{ave} = \frac{\sigma_{I_2}^2 I_1^2 + \sigma_{I_1}^2 I_2^2}{\sigma_{I_2}^2 I_1 + \sigma_{I_1}^2 I_2}. \qquad \text{Eqn (7)}$$

Weights of the Functional Form $w_i(p) = R_i^p$

Assuming $w_i(p) = R_i^p$ (i=1, 2), where $R_i$ is the radius of Lissajous i and p is a real number, then the SNR is $$SNR = \frac{R_1^p I_1 + R_2^p I_2}{\sqrt{R_1^{2p}\sigma_{I_1}^2 + R_2^{2p}\sigma_{I_2}^2}}, \qquad \text{Eqn (8)}$$

and by optimizing with respect to p, $$\frac{\partial(SNR)}{\partial p} = 0 \rightarrow p = \ln\left(\frac{I_1 \sigma_{I_2}^2}{I_2 \sigma_{I_1}^2}\right)\left[\ln\left(\frac{R_1}{R_2}\right)\right]^{-1}. \qquad \text{Eqn (9)}$$

The resulting average is represented by:

$$I_{ave} = \frac{R_1^p I_1 + R_2^p I_2}{R_1^p + R_2^p}, \quad p = \ln\left(\frac{I_1 \sigma_{I_2}^2}{I_2 \sigma_{I_1}^2}\right)\left[\ln\left(\frac{R_1}{R_2}\right)\right]^{-1}. \quad \text{Eqn (10)}$$

Figure 6:
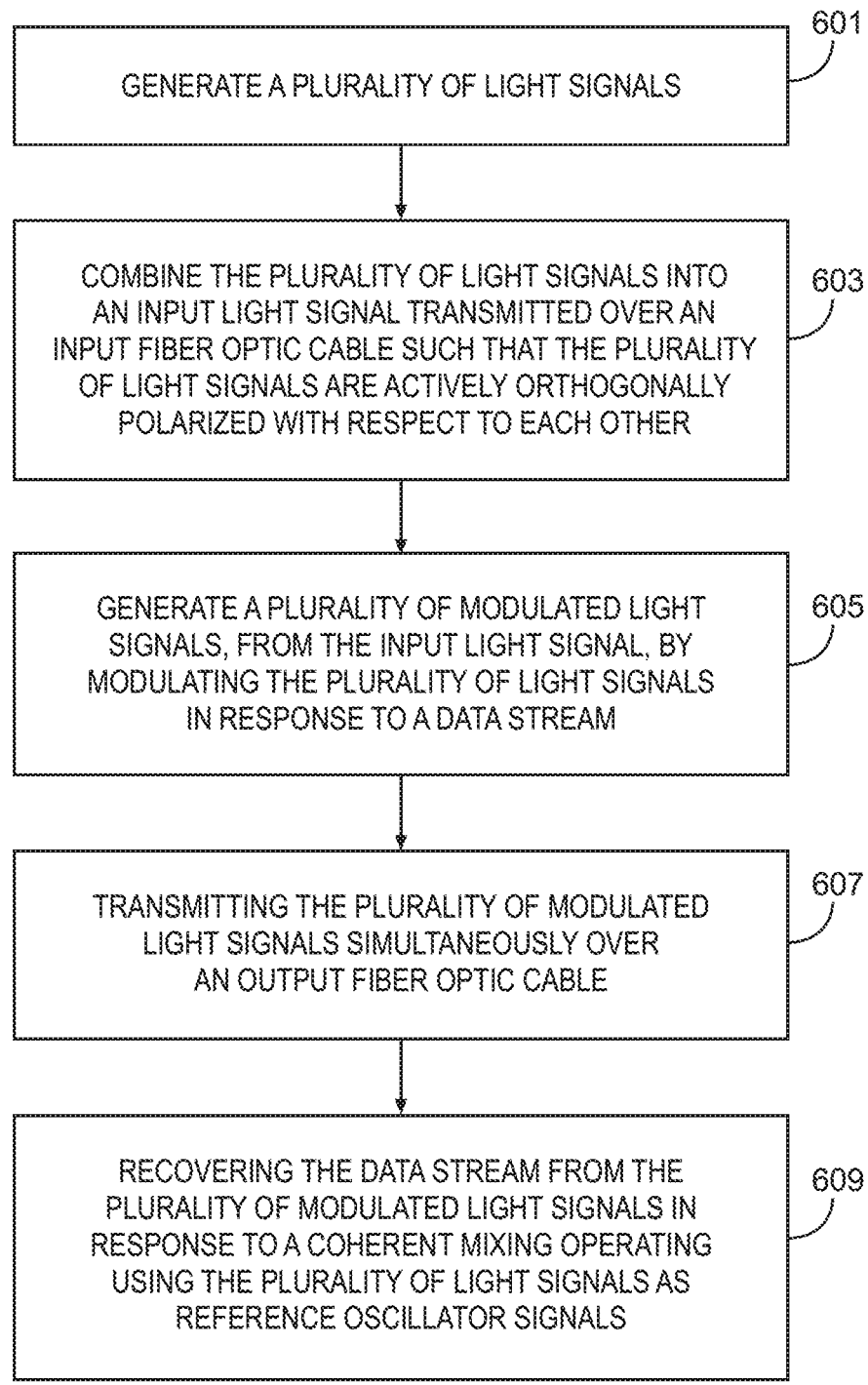
FIG. 6 is a flowchart of a telemetry method using a dual polarization system, according to various embodiments.

FIG. 6 is a flowchart of a telemetry method using a dual polarization system, according to various embodiments. This telemetry method is for purposes of illustration only as other methods may be used for operation of the above-described dual polarization system embodiments in the downhole environment.

In box 601, a plurality of light signals are generated. The light signals may be generated from one or more lasers or a single laser coupled to a beam splitter.

In block 603, the plurality of light signals are combined into an input light signal that is transmitted over an input single mode fiber optic cable. The combination process propagates the signals over the fiber optic cable at orthogonal polarizations such that the plurality of light signals are actively orthogonally polarized with respect to each other.

The input fiber optic cable, in an embodiment, connects a surface portion of the dual polarization system to the downhole tool apparatus. Propagation over the input fiber optic cable through a downhole environment may change the polarization of the light signals but the polarization should remain orthogonal. For example, one light signal may be polarized along the X-axis and another light signal may be polarized along the Y-axis.

In block 605, a plurality of modulated light signals are generated by modulating the plurality of light signals, from the input light signal, in response to a data stream. The data stream may be telemetry data (i.e., measurement data) from drilling operation measurements or wireline logging operation measurements. The same modulation may be applied to both polarizations or a different modulation may be applied to each orthogonal polarization.

In block 607, the plurality of modulated light signals is transmitted substantially simultaneously, over an output fiber optic cable, from the downhole tool apparatus to the surface portion of the system.

In block 609, the plurality of modulated light signals are used to recover the data stream in response to a coherent mixing operation using the plurality of light signals as reference oscillator signals. For example, the recovery operation may include combining a first modulated light signal of the plurality of modulated light signals with a first light signal of the plurality of light signals to produce a first recovered data stream. Similarly, the recovery operation may further include combining a second modulated light signal of the plurality of modulated light signals with a second light signal of the plurality of light signals to produce a second recovered data stream. The second light signal may comprise a different frequency from the first light signal.

The measurement data stream used to modulate the phase modulators as discussed previously may be telemetry data generated in the downhole environment in multiple different ways. In an embodiment, the data stream may include measurements from a drilling operation. In another embodiment, the data stream may include measurements from a wireline logging operation.

Figure 7:
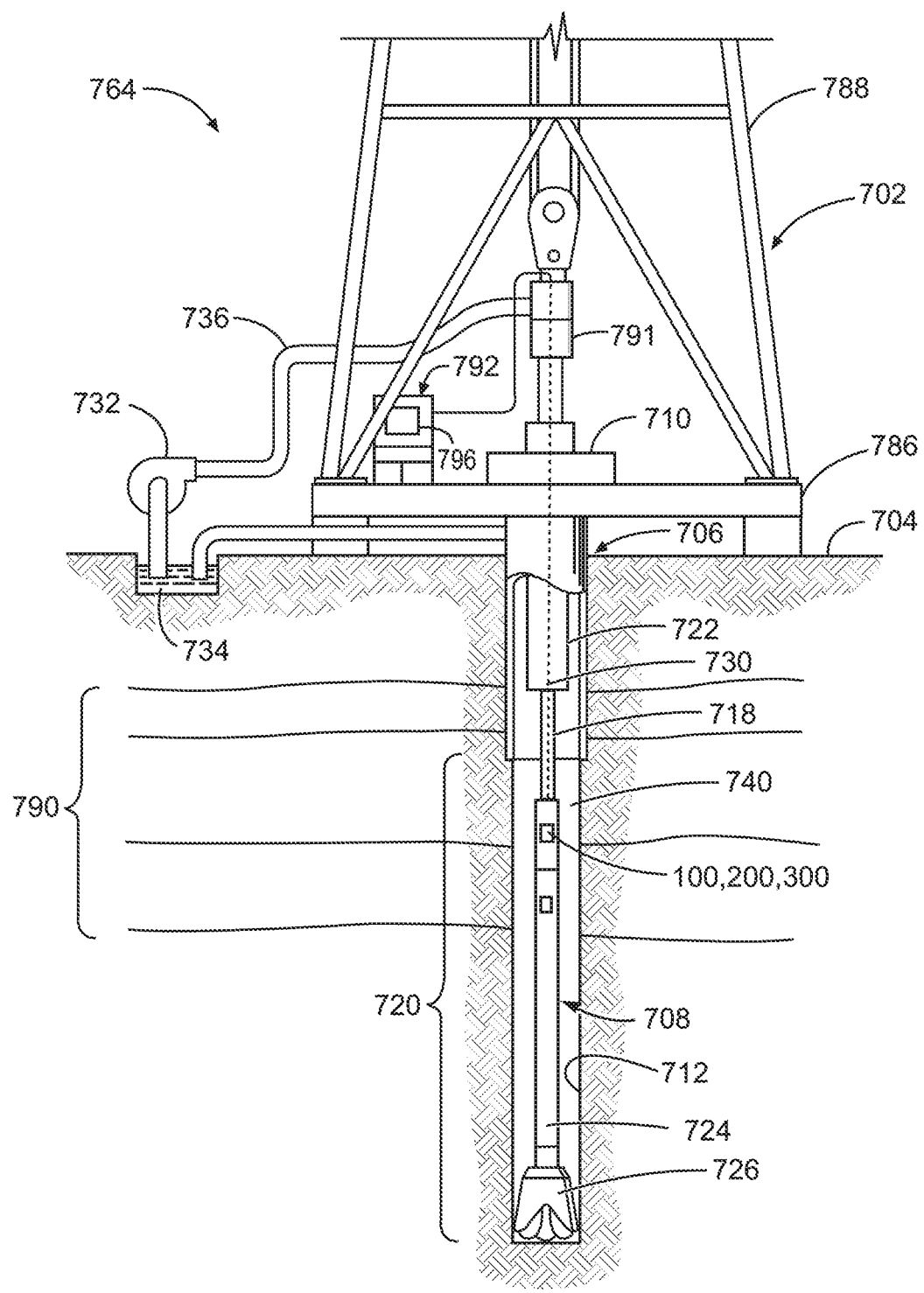
FIG. 7 is a diagram showing a drilling system, according to various embodiments.

FIG. 7 is a diagram showing a drilling system, according to various embodiments. The system 764 includes a drilling rig 702 located at the surface 704 of a well 706. The drilling rig 702 may provide support for a drillstring 708. The drillstring 708 may operate to penetrate the rotary table 710 for drilling the borehole 712 through the subsurface formations 790. The drillstring 708 may include a drill pipe 718 and the bottom hole assembly (BHA) 720 (e.g., drill string), perhaps located at the lower portion of the drill pipe 718.

The BHA 720 may include drill collars 722, a downhole tool 724, stabilizers, sensors, an RSS, a drill bit 726, as well as other possible components. The drill bit 726 may operate to create the borehole 712 by penetrating the surface 704 and the subsurface formations 790.

The BHA 720 may further include downhole tool 100, 200, 300 from the above embodiments. Cable 730 may incorporate all of the fiber optic cables of those embodiments such as fiber optic cables 130, 140, 230, 240, 330, 340. The downhole tool 100, 200, 300 may be used for fiber optic telemetry of measurement data from the downhole tool 724.

During drilling operations within the borehole 712, the drillstring 708 (perhaps including the drill pipe 718 and the BHA 720) may be rotated by the rotary table 710. Although not shown, in addition to or alternatively, the BHA 720 may also be rotated by a motor (e.g., a mud motor) that is located downhole. The drill collars 722 may be used to add weight to the drill bit 726. The drill collars 722 may also operate to stiffen the BHA 720, allowing the BHA 720 to transfer the added weight to the drill bit 726, and in turn, to assist the drill bit 726 in penetrating the surface 704 and subsurface formations 790.

During drilling operations, a mud pump 732 may pump drilling fluid (sometimes known by those of ordinary skill in the art as "drilling mud") from a mud pit 734 through a hose 736 into the drill pipe 718 and down to the drill bit 726. The drilling fluid can flow out from the drill bit 726 and be returned to the surface 704 through an annular area 740 between the drill pipe 718 and the sides of the borehole 712. The drilling fluid may then be returned to the mud pit 734, where such fluid is filtered. In some examples, the drilling fluid can be used to cool the drill bit 726, as well as to provide lubrication for the drill bit 726 during drilling operations. Additionally, the drilling fluid may be used to remove subsurface formation cuttings created by operating the drill bit 726.

A workstation 792 including a controller 796 may include modules comprising hardware circuitry, a processor, and/or memory circuits that may store software program modules and objects, and/or firmware, and combinations thereof that are configured to execute at least the method of FIG. 6. The workstation 792 may also include modulators and demodulators (including optical receivers, transmitters, transceivers, and other optical equipment known to a user versed in the art) for modulating and demodulating data transmitted downhole through the fiber optic cable 730 or telemetry received through the fiber optic cable 730 from the downhole environment. The workstation 792 and controller 796 are shown near the rig 702 only for purposes of illustration as these components may be located at remote locations. The workstation 792 may include the surface portion of the dual polarization system.

An optical rotary joint 791 may be located between the fiber in the drill string 708 and that on the surface. In another embodiment, the optical signals may be converted to electrical signals at the top of the drill string 708 and the signal transferred to surface processing systems or modulators/demodulators using an electrical slip ring in place of the optical rotary joint 791. Similarly, electrical signals can be sent to the top of the drill string 708 through the electrical slip ring and those signals could drive lasers that rotate with the drill string 708.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of a non-transitory computer-readable storage medium can include, but not be limited to, read only memory (ROM), random access memory (RAM), a magnetic disk storage device, an optical storage device, a flash memory, and other electronic, magnetic, and/or optical memory devices.

Figure 8:
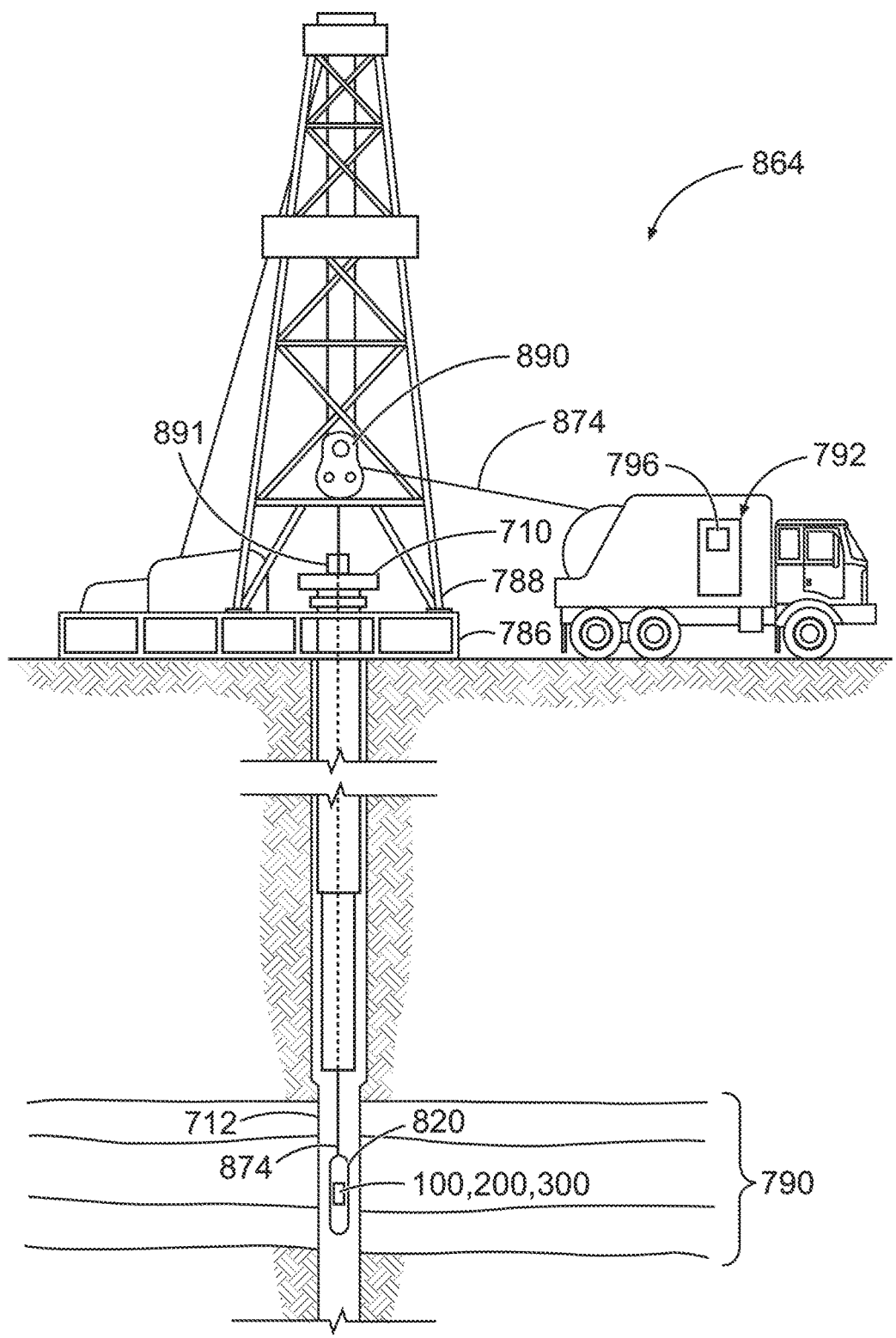
FIG. 8 is a diagram showing a wireline system, according to various embodiments.

FIG. 8 is a diagram showing a wireline system 864, according to various examples of the disclosure. The system 864 may comprise a wireline logging tool body 820, as part of a wireline logging operation in a cased and cemented borehole 712, that includes the downhole tool apparatus 100, 200, 300 as described previously.

A drilling platform 786 equipped with a derrick 788 that supports a hoist 890 can be seen. Drilling oil and gas wells is commonly carried out using a string of drill pipes connected together so as to form a drillstring that is lowered through a rotary table 710 into the cased borehole 712. Here it is assumed that the drillstring has been temporarily removed from the borehole 712 to allow the wireline tool 820 that includes the downhole tool 100, 200, 300 to be lowered by wireline or logging cable 874 (e.g., slickline cable) into the borehole 712. Typically, the wireline logging tool body 820 is lowered to the bottom of the region of interest and subsequently pulled upward at a substantially constant speed. The wireline or logging cable 874 may include the fiber optic cables 130, 140, 230, 240, 330, 340 as described previously.

During the upward trip, at a series of depths, various instruments may be used to perform measurements on the formation 790. The wireline data may be communicated to a surface logging facility (e.g., workstation 792) for processing, analysis, and/or storage using the above-described embodiments for the downhole tool 100, 200, 300 and the telemetry method of FIG. 6. In an embodiment, the workstation 792 may include the surface portion of the dual polarization system.

An optical rotary joint 891 may be located between a fiber wireline or logging cable 874 that is downhole and that on the surface. In another embodiment, the optical signals may be converted to electrical signals at the surface and the signal transferred to surface processing systems or modulators/demodulators using an electrical slip ring in place of the optical rotary joint 891.

Figure 9:
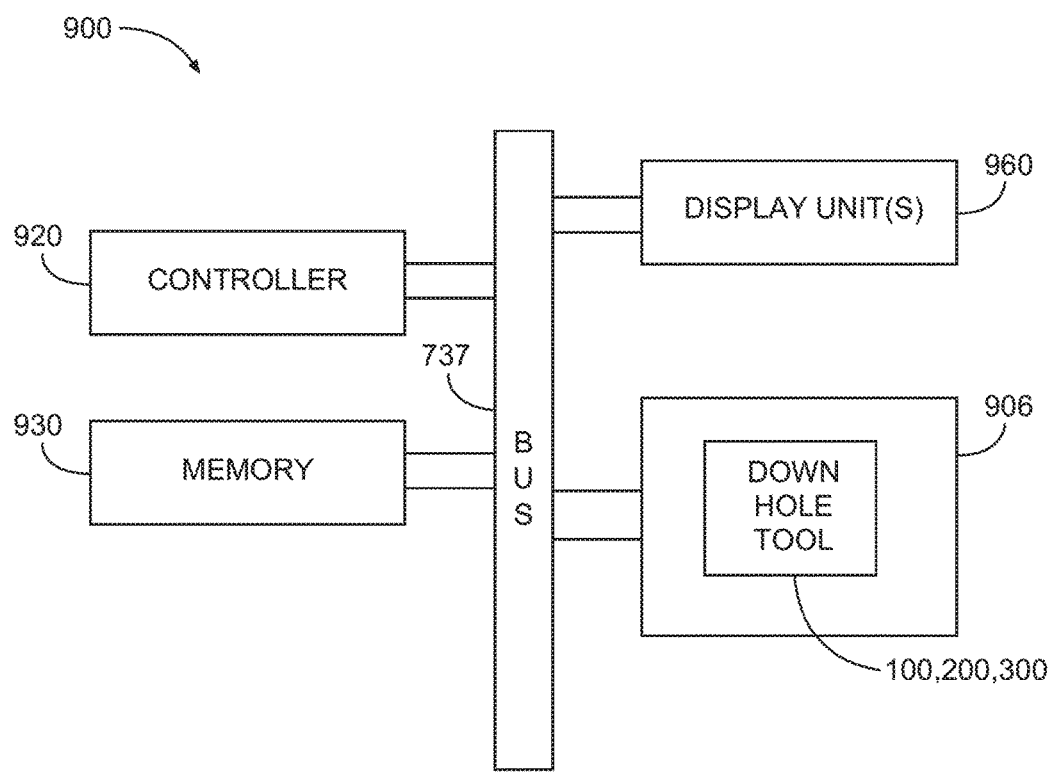
FIG. 9 is a block diagram of an example system operable to implement the activities of disclosed methods, according to various embodiments.

FIG. 9 is a block diagram of an example system 900 operable to implement the activities of disclosed methods, according to various examples of the disclosure. The system 900 may include a tool housing 906 having the downhole tool apparatus 100, 200, 300 such as that illustrated in FIGS. 1-3. The system 900 may be configured to operate in accordance with the teachings herein to perform telemetry from the downhole tool apparatus 100, 200, 300. The system 900 of FIG. 9 may be implemented as shown in FIGS. 7 and 8 with reference to the workstation 792 and controller 796.

The system 900 may include a controller 920, a memory 930, and a communications unit 935. The controller 920, the memory 930, and the communications unit 935 may be arranged to operate as a control circuit to control operation of the downhole tool 100, 200, 300 and execute any methods disclosed herein.

The system 900 may also include a bus 937, where the bus 937 provides electrical conductivity among the components of the system 900. The bus 937 can include an address bus, a data bus, and a control bus, each independently configured or in an integrated format. The bus 937 may be realized using a number of different communication mediums that allows for the distribution of components of the system 900. The bus 937 may include a network. Use of the bus 937 may be regulated by the controller 920.

The system 900 may include display unit(s) 960 as a distributed component on the surface of a wellbore, which may be used with instructions stored in the memory 930 to implement a user interface to monitor the operation of the tool 100, 200, 300 or components distributed within the system 900. Such a user interface may be operated in conjunction with the communications unit 935 and the bus 937. Many examples may thus be realized. A few examples of such examples will now be described.

While the above embodiments discuss using a downhole tool for the fiber optic telemetry, other embodiments may use the fiber optic telemetry in other fields of communications such as aerospace, subsea, and long-haul and data center communications.

Example 1 is an apparatus comprising: an input fiber optic cable configured to propagate a plurality of actively orthogonally polarized light beams; and an electro-optic modulator coupled to the input fiber optic cable and to a data stream, the electro-optic modulator configured to modulate the plurality of actively orthogonally polarized light beams in response to the data stream such that the plurality of actively orthogonally polarized light beams propagate the same data through an output fiber optic cable.

In Example 2, the subject matter of Example 1 can further include wherein the electro-optic modulator is a phase modulator and the data stream phase modulates each of the plurality of actively orthogonally polarized light beams.

In Example 3, the subject matter of Examples 1-2 can further include a polarizer coupled between the electro-optic modulator and the output fiber optic cable.

In Example 4, the subject matter of Examples 1-3 can further include wherein the electro-optic modulator includes a first phase modulator configured to phase modulate a first actively orthogonally polarized light beam of the plurality of actively orthogonally polarized light beams, the apparatus further comprising: a beam splitter coupled between the input fiber optic cable and the first phase modulator to split, from an input light beam, the plurality of actively orthogonally polarized light beams into the first and a second actively orthogonally polarized light beam; the first phase modulator coupled to the beam splitter and configured to generate a first modulated orthogonally polarized light beam; a second phase modulator coupled to the beam splitter and configured to generate a second modulated orthogonally polarized light beam; and a beam combiner coupled between the first and second phase modulators and the output fiber optic cable, the polarization beam combiner configured to combine the first and second modulated orthogonally polarized light beams into an output beam.

In Example 5, the subject matter of Examples 1-4 can further include wherein the first phase modulator generates the first modulated orthogonally polarized light beam in response to a first data stream and the second phase modulator generates the second modulated orthogonally polarized light beam in response to a second data stream, wherein the first data stream is different than the second data stream.

In Example 6, the subject matter of Examples 1-5 can further include wherein a first actively orthogonally polarized light beam is polarized on orthogonal axes of the electro-optic modulator.

In Example 7, the subject matter of Examples 1-6 can further include wherein the data stream comprises measurement data from a drilling operation.

In Example 8, the subject matter of Examples 1-7 can further include wherein the data stream comprises measurement data from a wireline logging operation.

Example 9 is a system comprising: at least one light source to generate a coherent light beam; a plurality of beam splitters coupled to the at least one light source, the plurality of beam splitters generating a plurality of light beams; a beam combiner coupled to the plurality of beam splitters to combine a first light beam of the plurality of light beams with a second light beam of the plurality of light beams into a single light beam propagated over an input fiber optic cable, wherein the first light beam is combined at a first polarization and the second light beam is combined at a second polarization orthogonal to the first polarization; a downhole tool apparatus coupled to the input fiber optic cable and configured to generate first and second modulated light beams, from the first and second light beams, in response to at least one measurement data stream; and data recovery circuitry coupled to the downhole tool apparatus over an output fiber optic cable, the data recovery circuitry configured to recover the at least one measurement data stream from the first and second modulated light beams.

In Example 10, the subject matter of Example 9 can further include wherein the at least one light source comprises first and second lasers.

In Example 11, the subject matter of Examples 9-10 can further include a first beam splitter of the plurality of beam splitters coupled to the first laser and generating a first local oscillator signal; and a second beam splitter of the plurality of beam splitters coupled to the second laser and generating a second local oscillator signal.

In Example 12, the subject matter of Examples 9-11 can further include wherein the data recovery circuitry comprises first and second coherent mixers, the system further comprising: one of an output beam splitter or a wavelength-division multiplexer coupled to the output fiber optic cable to separate the first and second modulated light beams from a single light beam propagated over the output fiber optic cable; the first coherent mixer coupled to the first beam splitter and to one of the output beam splitter or the wavelength-division multiplexer to generate a first set of recovered light states in response to the first local oscillator signal and the first modulated light beam; and the second coherent mixer coupled to the second beam splitter and to one of the output beam splitter or the wavelength-division multiplexer to generate a second set of recovered light states in response to the second local oscillator signal and the second modulated light beam.

In Example 13, the subject matter of Examples 9-12 can further include: an acousto-optical modulator coupled between the at least one light source and the beam combiner; and a radio frequency (RF) signal source coupled to the acousto-optical modulator for generating an RF signal, wherein the acousto-optical modulator is configured to shift a frequency of one of the first or the second light beams, prior to the beam combiner, in response to the RF signal.

In Example 14, the subject matter of Examples 9-13 can further include wherein the downhole tool apparatus is disposed in a bottom hole assembly or a wireline logging tool.

Example 15 is a method comprising: generating a plurality of light signals; combining the plurality of light signals into an input light signal transmitted over an input fiber optic cable such that the plurality of light signals are actively orthogonally polarized with respect to each other; generating a plurality of modulated light signals, from the input light signal, by modulating the plurality of light signals in response to a data stream; transmitting the plurality of modulated light signals simultaneously over an output fiber optic cable; and recovering the data stream from the plurality of modulated light signals.

In Example 16, the subject matter of Example 15 can further include wherein generating the plurality of modulated light signals comprises modulating each of the plurality of light signals in response to one data stream.

In Example 17, the subject matter of Examples 15-16 can further include wherein generating the plurality of modulated light signals comprises: modulating a first light signal of the plurality of light signals in response to a first data stream; and modulating a second light signal of the plurality of light signals in response to a second data stream, wherein the first and second data streams comprise different data streams.

In Example 18, the subject matter of Examples 15-17 can further include recovering the data stream from the plurality of modulated light signals in response to a coherent mixing operation using the plurality of light signals as reference oscillator signals.

In Example 19, the subject matter of Examples 15-18 can further include wherein the coherent mixing operation comprises: combining a first modulated light signal of the plurality of modulated light signals with a first light signal of the plurality of light signals to produce a first recovered data stream; and combining a second modulated light signal of the plurality of modulated light signals with a second light signal of the plurality of light signals to produce a second recovered data stream, wherein the second light signal comprises a different frequency from the first light signal.

In Example 20, the subject matter of Examples 15-19 can further include generating the data stream from measurements from a drilling operation or a wireline logging operation.

In Example 21, the subject matter of Examples 15-20 can further include wherein recovering the data stream comprises: recovering the data stream from each of the plurality of modulated light signals; and averaging the recovered data streams from the plurality of modulated light signals to generate a recovered data stream.

Although specific examples have been illustrated and described herein, it will be appreciated by those of ordinary skill in the art that any arrangement that is calculated to achieve the same purpose may be substituted for the specific examples shown. Various examples use permutations and/or combinations of examples described herein. It is to be understood that the above description is intended to be illustrative, and not restrictive, and that the phraseology or terminology employed herein is for the purpose of description. Combinations of the above examples and other examples will be apparent to those of skill in the art upon studying the above description.

What is claimed is:

1. An apparatus comprising:
an input fiber optic cable configured to propagate a plurality of actively orthogonally polarized light beams;
an electro-optic modulator coupled to the input fiber optic cable and to a data stream, the electro-optic modulator configured to modulate the plurality of actively orthogonally polarized light beams in response to the data stream such that the plurality of actively orthogonally polarized light beams propagate the same data through an output fiber optic cable, wherein the electro-optic modulator comprises a first phase modulator configured to phase modulate a first actively orthogonally polarized light beam of the plurality of actively orthogonally polarized light beams;
a beam splitter coupled between the input fiber optic cable and the first phase modulator to split, from an input light beam, the plurality of actively orthogonally polarized light beams into the first and a second actively orthogonally polarized light beam, wherein the first phase modulator is coupled to the beam splitter and configured to generate a first modulated orthogonally polarized light beam;
a second phase modulator coupled to the beam splitter and configured to generate a second modulated orthogonally polarized light beam; and
a beam combiner coupled between the first and second phase modulators and the output fiber optic cable, the polarization beam combiner configured to combine the first and second modulated orthogonally polarized light beams into an output beam.

2. The apparatus of claim 1, wherein the electro-optic modulator is a phase modulator and the data stream phase modulates each of the plurality of actively orthogonally polarized light beams.

3. The apparatus of claim 1, further comprising a polarizer coupled between the electro-optic modulator and the output fiber optic cable.

4. The apparatus of claim 1, wherein the first phase modulator generates the first modulated orthogonally polarized light beam in response to a first data stream and the second phase modulator generates the second modulated orthogonally polarized light beam in response to a second data stream, wherein the first data stream is different than the second data stream.

5. The apparatus of claim 1, wherein a first actively orthogonally polarized light beam is polarized on orthogonal axes of the electro-optic modulator.

6. The apparatus of claim 1, wherein the data stream comprises measurement data from a drilling operation.

7. The apparatus of claim 1, wherein the data stream comprises measurement data from a wireline logging operation.

8. A system comprising: at least one light source to generate a coherent light beam; a plurality of beam splitters coupled to the at least one light source, the plurality of beam splitters generating a plurality of light beams; a beam combiner coupled to the plurality of beam splitters to combine a first light beam of the plurality of light beams with a second light beam of the plurality of light beams into a single light beam propagated over an input fiber optic cable, wherein the first light beam is combined at a first polarization and the second light beam is combined at a second polarization orthogonal to the first polarization; a downhole tool apparatus coupled to the input fiber optic cable and configured to generate first and second modulated light beams, from the first and second light beams, in response to at least one measurement data stream; and data recovery circuitry coupled to the downhole tool apparatus over an output fiber optic cable, the data recovery circuitry configured to recover the at least one measurement data stream from the first and second modulated light beams.

9. The system of claim 8, wherein the at least one light source comprises first and second lasers.

10. The system of claim 9, further comprising: a first beam splitter of the plurality of beam splitters coupled to the first laser and generating a first local oscillator signal; and a second beam splitter of the plurality of beam splitters coupled to the second laser and generating a second local oscillator signal.

11. The system of claim 10, wherein the data recovery circuitry comprises first and second coherent mixers, the system further comprising: one of an output beam splitter or a wavelength-division multiplexer coupled to the output fiber optic cable to separate the first and second modulated light beams from a single light beam propagated over the output fiber optic cable; the first coherent mixer coupled to the first beam splitter and to one of the output beam splitter or the wavelength-division multiplexer to generate a first set of recovered light states in response to the first local oscillator signal and the first modulated light beam; and the second coherent mixer coupled to the second beam splitter and to one of the output beam splitter or the wavelength-division multiplexer to generate a second set of recovered light states in response to the second local oscillator signal and the second modulated light beam.

12. The system of claim 8, further comprising: an acousto-optical modulator coupled between the at least one light source and the beam combiner; and a radio frequency (RF) signal source coupled to the acousto-optical modulator for generating an RF signal, wherein the acousto-optical modulator is configured to shift a frequency of one of the first or the second light beams, prior to the beam combiner, in response to the RF signal.

13. The system of claim 8, wherein the downhole tool apparatus is disposed in a bottom hole assembly or a wireline logging tool.

14. A method comprising:
generating a plurality of light signals, wherein generating the plurality of light signals comprises:
modulating a first light signal of the plurality of light signals in response to a first data stream; and
modulating a second light signal of the plurality of light signals in response to a second data stream, wherein the first and second data streams comprise different data streams;
combining the plurality of light signals into an input light signal transmitted over an input fiber optic cable such that the plurality of light signals are actively orthogonally polarized with respect to each other;
generating a plurality of modulated light signals, from the input light signal, by modulating the plurality of light signals in response to a data stream;
transmitting the plurality of modulated light signals simultaneously over an output fiber optic cable; and
recovering the data stream from the plurality of modulated light signals in response to a coherent mixing operation using the plurality of light signals as reference oscillator signals.

15. The method of claim 14, wherein generating the plurality of modulated light signals comprises modulating each of the plurality of light signals in response to one data stream.

16. The method of claim 14, wherein the coherent mixing operation comprises: combining a first modulated light signal of the plurality of modulated light signals with a first light signal of the plurality of light signals to produce a first recovered data stream; and combining a second modulated light signal of the plurality of modulated light signals with a second light signal of the plurality of light signals to produce a second recovered data stream, wherein the second light signal comprises a different frequency from the first light signal.

17. The method of claim 14, further comprising generating the data stream from measurements from a drilling operation or a wireline logging operation.

18. A method comprising:
   generating a plurality of light signals;
   combining the plurality of light signals into an input light signal transmitted over an input fiber optic cable such that the plurality of light signals are actively orthogonally polarized with respect to each other;
   generating a plurality of modulated light signals, from the input light signal, by modulating the plurality of light signals in response to a data stream;
   transmitting the plurality of modulated light signals simultaneously over an output fiber optic cable; and
   recovering the data stream from the plurality of modulated light signals, wherein recovering the data stream comprises:
   recovering the data stream from each of the plurality of modulated light signals; and
   averaging the recovered data streams from the plurality of modulated light signals to generate a recovered data stream.

* * * * *